United States Patent
Holz et al.

[15] 3,680,363
[45] Aug. 1, 1972

[54] DEVICES FOR DETECTING AND PROCESSING VIBRATIONS OCCURRING IN THE MOVING BLADES OF A ROTARY COMPRESSOR OR SIMILAR APPARATUS

[72] Inventors: Robert Gustave Holz, Draveil; Adolf Braun, Dammarie-les-lys, both of France

[73] Assignee: Societe Nationale D'Etude Et De Construction De Moteurs D'Aviation, Paris, France

[22] Filed: Oct. 6, 1970

[21] Appl. No.: 78,380

[30] Foreign Application Priority Data

Oct. 7, 1969 France..........................6934118

[52] U.S. Cl...................................................73/71.4
[51] Int. Cl................................................G01n 29/00
[58] Field of Search ......................73/71.4; 324/163

[56] References Cited

UNITED STATES PATENTS 3,058,339  10/1962  Shapiro..........................73/71.4
3,289,073  11/1966  Lueffler.........................73/71.4

*Primary Examiner*—Richard C. Queisser
*Assistant Examiner*—Arthur E. Korkosz
*Attorney*—Watson, Cole, Grindle & Watson

[57] ABSTRACT

A device for detecting vibrations in the moving blades of a rotary compressor, comprising a pick-up implanted in the internal edge of the pick-up, the signal from which is applied exclusively to an electronic circuit comprising means for deriving from it the modulation ratio and for deriving from said ratio, when it exceeds a predetermined threshold, an electrical signal. The application of this device is to the suppression of vibrations due to airflow break-up or breakaway effects in the blading of aircraft jet engine compressors.

6 Claims, 2 Drawing Figures

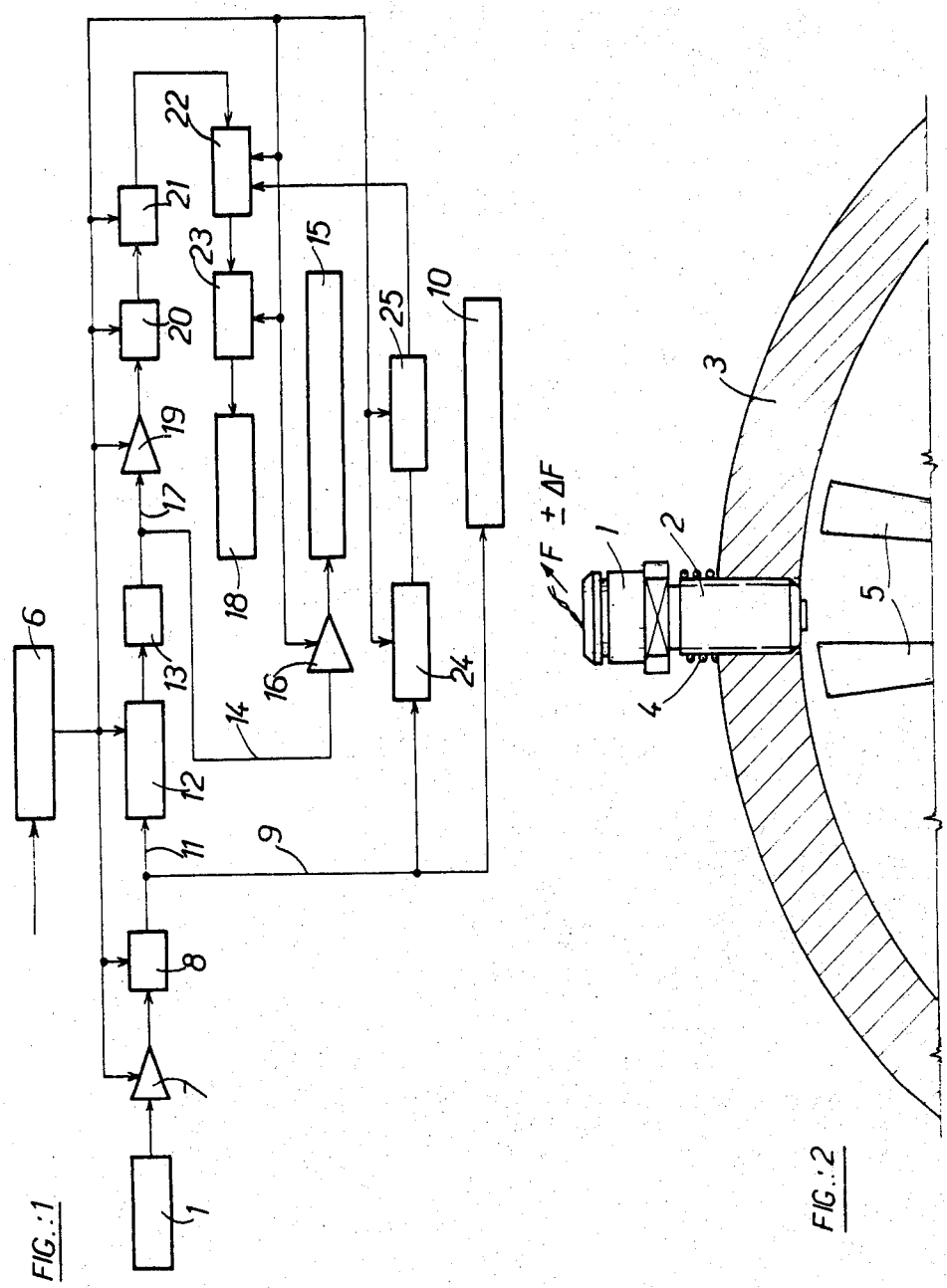

DEVICES FOR DETECTING AND PROCESSING VIBRATIONS OCCURRING IN THE MOVING BLADES OF A ROTARY COMPRESSOR OR SIMILAR APPARATUS

This invention relates generally to the field of devices used in measurement and adjustment techniques in rotary apparatus, and more particularly to a device for picking up and monitoring vibrations which occur in the moving blades of a rotary compressor or like apparatus, more especially an aircraft jet engine compressor.

It is well known that the compressors of aircraft jet engines, which operate at a high stage compression ratio, are often the source of airflow break-up phenomena in the front end blading and under intermediate operating conditions, as a consequence of the overload due to the deviations in off-design conditions, between the flow and pressure characteristics of the first and last stages.

In order to obviate these undesired phenomena, a number of artifices can be resorted to, and one of the ones most commonly employed consists in reducing the load on the front end stage by means of spill valves, below a certain operating level.

It will be apparent that this kind of procedure entails a substantial loss in flow rate under intermediate operating conditions and it is desirable therefore to contrive to limit the extent to which it has to be used. Since the flow separation phenomena are a function of ambient conditions and in particular of the mass flow, these being conditions which essentially vary with altitude and the mach number of flight, the separation has no systematic relationship to the normally accessible parameters, such as the speed of rotation for example.

These phenomena can be dangerous if resonance at the natural frequency of the blading takes place. Even if such resonance does not occur and vibration is limited to a fatigue level which is acceptable for the blading, these phenomena nevertheless indicate inefficient operation of the compressor. Thus, whatever the case, it is desirable to detect them and, if required, eliminate them as soon as possible.

U.S. Pat. No. 3,058,339 already discloses a detector of and device for measuring the separation vibrations in a turbo-compressor, which comprises, at the level of the blade ring, a pick-up implanted in the internal edge of the compressor housing and designed to detect the passage of successive rotating blades and thus derive an electrical signal which is subsequently processed by electronic means.

The main drawback of this device resides in the fact that it requires a reference signal, that is to say a second signal taken from the rotary system by a special pick-up provided from the purpose, without which the pulses of the main signal could not be processed.

The present invention makes it possible to do without this kind of reference signal.

To this end, while using the single pick-up or sensor at the level of the blade ring, implanted in the internal edge of the compressor housing and designed to effect remote detection of the passage of the rotating blades and produce an electrical signal which is subsequently processed by electronic means, a procedure is adopted in accordance with which the signal from the pick-up is applied as the sole input signal to an electronic circuit comprising means for determining the modulation ratio of the signal (relative frequency variation $\Delta F/F$), and deriving therefrom, when it passes beyond a predetermined threshold level, an electrical signal for controlling elements associated with the rotary compressor and which are designed to eliminate vibrations therein. This definition in no way limits the precise design of the type of pick-up, which may in fact be electrical (electromagnetic, capacitive, or inductive) or for that matter optical, and may in particular be designed to accord with the material employed in the manufacture of the blades.

Further features of the invention will be understood from a consideration of the following description given below by way of example with reference to the accompanying drawings, in which:

FIG. 1 is a block diagram of the electrical circuits of one embodiment of the invention; and FIG. 2 illustrates a pick-up in accordance with the invention located in a typical.

In accordance with the invention, a single pick-up or sensor, opposite the relevant compressor blade wheel, is arranged to detect the vibration in the blades and to extract therefrom quantitative data about the vibration produced by rotary stall affecting the moving blading, without it being necessary to sense each separate element, the associated electronic means producing at the end of the circuit quantitative data on the overall modulation ratio of the frequency of passage of the tips. This information is proportional to the alternating stress in accordance with previously established relationships deriving from the vibrational pecularities of the blading and the form of the excitatory phenomenon.

As FIG. 2 shows, the pick-up 1 is electromagnetic in design. It may for example be constituted by a ferrite rod or rod of some other ferromagnetic material 2, one end of which is flush with the internal surface of the housing 3 of the compressor and carries a coil 4 so that the passage of each blade 5 of the compressor varies the leakage reluctance of the magnetic circuit and generates in the coil 4 an alternating voltage whose frequency is a function of the speed of rotation of the compressor and the number of blades (which are made of magnetic material in the present case).

The electrical signal produced by the pick-up is thus a voltage at the frequency of passage of the blades, which is modulated, in the absence of any vibration, simply by the dispersion due to defects in spacing (varying under the effect of vibration), between the tips of the different blades. The amplitude of the modulation resulting from the passage of the blades, is proportional to the vibrational amplitude. In other words:

$$F = F_o [1 + K_1 A \cos(\Omega_a t + \phi)],$$

$F_o$ being the frequency of passage of the blades in the absence of any vibration, $K_1$ a constant coefficient, $A$ the modulation factor, which has a pulsatory component $\Omega_a$ out of phase by an angle $\phi$. It can be shown that if there is derived from the signal F a signal corresponding to its modulation, then this signal corresponds to a deflection (variable), produced by the blade vibration.

For each blade type, there is an experimentally determined relationship giving the stresses occurring in these blades as a function of the amplitude of the vibrational motion generated in them. There corresponds with the stress level a vibrational amplitude level. In accordance with the invention, the modulation is determined in relation to this level or threshold.

A single drilling through the housing enables the pick-up to be installed and its signal is amplified and filtered in order to derive a signal representing the spacing modulation in a characteristic frequency band, and in order to eliminate the carrier as well as noise components which are due to geometric irregularities. This frequency band will include a harmonic of the frequency of propagation of the flow separation phenomenon in free space and will make it possible to determine the amplitude of vibration of the blades.

This signal can be employed, for a specific time, to operate upon a conventional device in order to eliminate the vibrations due to the separation phenomenon (such device can include for example spill valves, adjusters for variable pitch blading, injection of water, etc.)

On the other hand the signal produced by the measurement circuit, since it has an amplitude proportional to the vibratory stress, can advantageously be exploited to determine the alternating fatigue. It will be apparent that the signal produced by the pick-up can also be used simultaneously to determine the speed of rotation of the machine.

At the same time, it is possible to detect the surging condition of the compressor and to re-establish normal operating conditions by acting upon any convenient parameter for the purpose.

If we refer now to FIG. 1, then we will see the pick-up marked 1, which produces a signal of frequency $F \pm \Delta F$ in accordance with the blade spacing modulation.

On the other hand, at 6, a stabilized supply is available. We then have a certain number of devices which are known per se and are currently employed in electronics, the combination of which makes it possible to understand how the signal produced by the pick-up is processed; 7 is a preamplifier and 8 a shaper stage. Through the output 9 it is possible for example to pick up a signal which directly gives the speed of rotation of the blades on a tachometer 10. The parallel output 11 terminates in a frequency discriminator 12 followed by a band-pass filter 13.

At the output of this filter a tapping 14 can be used to provide recording of the vibrations on a recorder 15, possibly after amplification in the amplifier 16.

Another tapping 17 supplies the signal within the passband of the control means, for example the spill valves 18, this following amplification at 19, detection at 20, and passage through a trigger 21, a monostable trigger stage 22 and a power relay 23.

The monostable trigger stage 22 can be locked for frequencies $F < F_o$ (characteristic frequency) by a voltage coming from a discriminator 24 which converts from frequency to voltage a signal from the tapping 9 downstream of the shaper 8 and through a trigger 25.

Once the spill valves operation ceases the valve closes again, while the monostable trigger 22 automatically reverts to the inoperative position. The time of operation of the monostable trigger stage is best adjusted in accordance with experience. The threshold required for the operation of the device is preferably set within the amplifier 19.

We claim:

1. A device for sensing and monitoring the vibrations occurring in the moving blades of a rotary compressor housing, comprising: a single sensor mounted through a passage so that the operative end of the sensor is flush with the internal wall of the compressor housing, said sensor producing an electrical signal which varies as a function of the successive displacements of the compressor blades past said sensor, an electronic circuit connected to said sensor and including means for deriving an electrical signal corresponding to the modulation of the normal frequency of the moving blades, a threshold stage producing an electrical output signal when said modulation exceeds a predetermined value, means responsive to said output signal for monitoring said electrical output signal.

2. A device as claimed in claim 1, in which said monitoring means comprise a tachometer.

3. A device as claimed in claim 1, in which said monitoring means comprise a vibration recorder.

4. A device as claimed in claim 1 further comprising means for eliminating vibrations of said moving blades in response to said electrical output signal.

5. A device as claimed in claim 4, further comprising a monostable trigger for controlling said means for eliminating.

6. A device as claimed in claim 5, further comprising means for locking said monostable trigger at frequencies lower than the normal operating frequency of the moving blades.

* * * * *